United States Patent
Korinko et al.

[11] Patent Number: 5,976,337
[45] Date of Patent: Nov. 2, 1999

[54] METHOD FOR ELECTROPHORETIC DEPOSITION OF BRAZING MATERIAL

[75] Inventors: Paul Stephen Korinko, Greenwood; Mark Lawrence Hunt, Indianapolis, both of Ind.

[73] Assignee: Allison Engine Company, Indianapolis, Ind.

[21] Appl. No.: 08/958,360

[22] Filed: Oct. 27, 1997

[51] Int. Cl.$^6$ .................................................. C25D 13/00
[52] U.S. Cl. .......................... 204/487; 204/484; 204/490; 204/491
[58] Field of Search ................................... 204/484, 485, 204/487, 490, 491

[56] References Cited

U.S. PATENT DOCUMENTS

| | | | |
|---|---|---|---|
| 2,982,707 | 5/1961 | Scheible .................................. | 204/181 |
| 3,955,935 | 5/1976 | Shockley et al. .......................... | 29/194 |
| 4,482,295 | 11/1984 | North et al. ............................ | 416/96 A |
| 4,505,639 | 3/1985 | Groess et al. ........................... | 416/97 R |
| 4,507,051 | 3/1985 | Lesgourgues et al. ................ | 416/97 R |
| 4,786,234 | 11/1988 | Readnour .................................. | 415/115 |
| 5,057,196 | 9/1986 | Lesgourgues ........................... | 228/194 |
| 5,193,980 | 3/1993 | Kaincz et al. ........................ | 416/97 A |
| 5,336,382 | 8/1994 | Bodin .................................. | 204/181.6 |
| 5,383,766 | 1/1995 | Przirembel et al. .................. | 416/97 A |
| 5,392,515 | 2/1995 | Auxier et al. ....................... | 29/889.721 |
| 5,405,242 | 4/1995 | Auxier et al. ........................... | 415/115 |
| 5,411,582 | 5/1995 | Bodine .................................. | 106/1.05 |
| 5,419,039 | 5/1995 | Auxier et al. ....................... | 29/889.72 |

FOREIGN PATENT DOCUMENTS

| | | |
|---|---|---|
| 2308704 | 11/1976 | France . |
| 1285369 | 8/1972 | United Kingdom . |
| 1299904 | 12/1972 | United Kingdom . |
| 1466204 | 3/1977 | United Kingdom . |

*Primary Examiner*—Kishor Mayekar
*Attorney, Agent, or Firm*—Woodard, Emhardt, Naughton Moriarty & McNett

[57] ABSTRACT

A method of brazing which includes deposition of brazing material by electrophoresis. Deposition is performed with a low viscosity, low surface tension bath comprising an alcohol, a nitroalkane, and a complex ionic solute. Brazing powder is added to this bath in the quantity of about 0.02 to about 0.04 kilograms per liter. A nonconductive coating is applied to areas where a brazing material should not be deposited, such as small passageways. This method is shown to be useful in applying brazing material adjacent small passageways, such that the brazing material is accurately deposited and does not flow into and interfere with the passageway after the braze joint is formed.

31 Claims, 7 Drawing Sheets

METHOD FOR ELECTROPHORETIC DEPOSITION OF BRAZING MATERIAL

FIELD OF THE INVENTION

The present invention relates generally to a method of applying brazing material by electrophoretic deposition. It is especially useful in applying brazing material on small shapes adjacent passageways, in which it is desirable to keep the brazing material out of the passageway. However, certain applications may be outside of this field.

BACKGROUND OF THE INVENTION

The performance of a gas turbine engine is sometimes limited by the maximum temperature to which certain components can be exposed. These components, such as turbine blades and vanes, various seals and spacers, combustors, and other components, are sometimes actively cooled with air from the engine's compressor, so that the component metal temperatures can be maintained at acceptable levels while being exposed to gas temperatures that are in excess of permissible metal temperatures.

This active cooling comes with an inherent trade off. Although higher gas temperatures tend to improve the performance of the engine, the use of air from the compressor for active cooling tends to lower the performance of the engine. It is imperative that the scheme for active cooling use as little air as possible, so that performance gains are maximized.

In order to cool that various components efficiently, numerous component internal cooling flowpath designs have been used to optimally transfer heat from the component into the cooling air. Examples of such cooling flowpath designs can be found in U.S. Pat. Nos. 4,930,980 issued to North et al.; 4,236,870 issued to Hucul, Jr. et al.; 4,946,346 issued to Ito; 5,062,768 issued to Marriage; and British Patent No. 2,246,174A issued to Lings et al.

These flowpath designs provide cooling air to various regions of the component, and often use small features to enhance heat transfer. Examples of cooling flowpath designs with small features include U.S. Pat. Nos. 4,770,608 issued to Anderson et al.; 4,962,640 issued to Tobery; 5,281,084 issued to Noe et al.; and 5,193,975 issued to Bird et al. Small sized features such as pins, pedestals, walls, and passageways permit an increased number of such features to be included in the cooling flowpath. A large number of cooling pedestals, for example, increases the surface area of the component exposed to the cooling air. A small size for cooling passageways permits not only a larger number of passageways, but may also increase the convective heat transfer coefficient of the passageway.

However, use of small features such as pins, pedestals, walls, and passageways poses a problem during manufacturing. These features are often cast or etched onto one workpiece which must then be joined to another workpiece. Joining methods often include welding, brazing, or diffusion bonding. Examples of cooling flowpath designs in which portions of the workpieces are brazed include U.S. Pat. Nos. 5,263,820 issued to Tubbs; 4,786,234 issued to Readnour; 4,505,639 issued to Groess et al.; 4,482,295 issued to North et al.; 5,419,039, 5,392,515, and 5,405,242 issued to Auxier et al.; 5,383,766 issued to Przirembel et al.; 5,193,980 issued to Kaincz et al.; and British Patent Specifications No. 1,285,369 issued to Steel et al. and 1,299,904 to Curtiss Wright Corporation.

Brazing of flowpaths with small geometric features presents the problem of excess brazing material interfering with the intended use of the feature. For example, excessive brazing material within a cooling air passageway can reduce or completely eliminate airflow through the passageway, with subsequent local or general overheating of the gas turbine component. It is important that excessive brazing material be kept from areas adjacent to various cooling flowpath features. U.S. Pat. No. 4,507,051 issued to Lesgourgues et al. discusses brazing of actively cooled gas turbine components.

One manner of depositing brazing material is by electrophoresis. U.S. Pat. Nos. 5,336,382 issued to Bodin, and 5,411,582 issued to Bodine, describe use of electrophoresis with a mucilage remarkable for its high viscosity, the muciliage containing brazing powder with grains as large as 53 microns. Outer areas in which brazing material is not desired are masked by a suitable adhesive masking tape, and inner cavities are masked with silicone plugs.

What is needed is a method of brazing components in which brazing material can be accurately deposited near small features. The present invention provides this method in a novel and unobvious way.

SUMMARY OF THE INVENTION

A method for brazing, comprising preparing a bath comprised of a solvent solution, a binder, and a compound for ionically interacting with the binder; mixing into the bath a powder suitable for brazing, the particle size of the powder being less than about 37 microns; applying a nonconductive coating to a passageway defined on a first workpiece; depositing brazing material by electrophoresis onto a portion of the first workpiece adjacent the passageway; placing the portion of the first workpiece in contact with a second workpiece; and heating the assembly of the first workpiece and second workpiece such that a braze joint is formed between the second workpiece and the first workpiece.

It is an object of the present invention to provide an improved method for brazing.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides a method for depositing brazing material onto a first workpiece which is ultimately brazed to a second workpiece, forming one or several braze joints. It is useful for depositing brazing material onto portions of the first workpiece that are adjacent passageways, the passageways being either in the first workpiece or in the assembly of workpieces, in which it is desirable to keep the brazing material out of the passageway after the braze joint is formed. It is especially useful in components used in hot sections of a gas turbine engine, including blades, vanes, combustors, and seals, in which the passageways ultimately flow cooling air. Often such cooling passageways are small, so that a relatively large surface area is exposed to the cooling air, and shaped to provide cooling air where needed.

The present invention includes the discoveries that a low viscosity, low surface tension electrophoretic bath is useful for depositing a controlled amount of brazing material onto small features such that the brazing material does not interfere with passageways adjacent to the small features after the braze joints are formed. Prior to the electrophoretic deposition, the passageways have applied to them a nonconductive coating which both inhibits deposition within the passageway, and also inhibits excess deposition on the edges adjacent the passageways. This invention also includes the discovery that a binder material used within the electrophoretic process, such as the protein zein, does not appreciably interfere or degrade the quality of the final braze joint.

Figure 1:
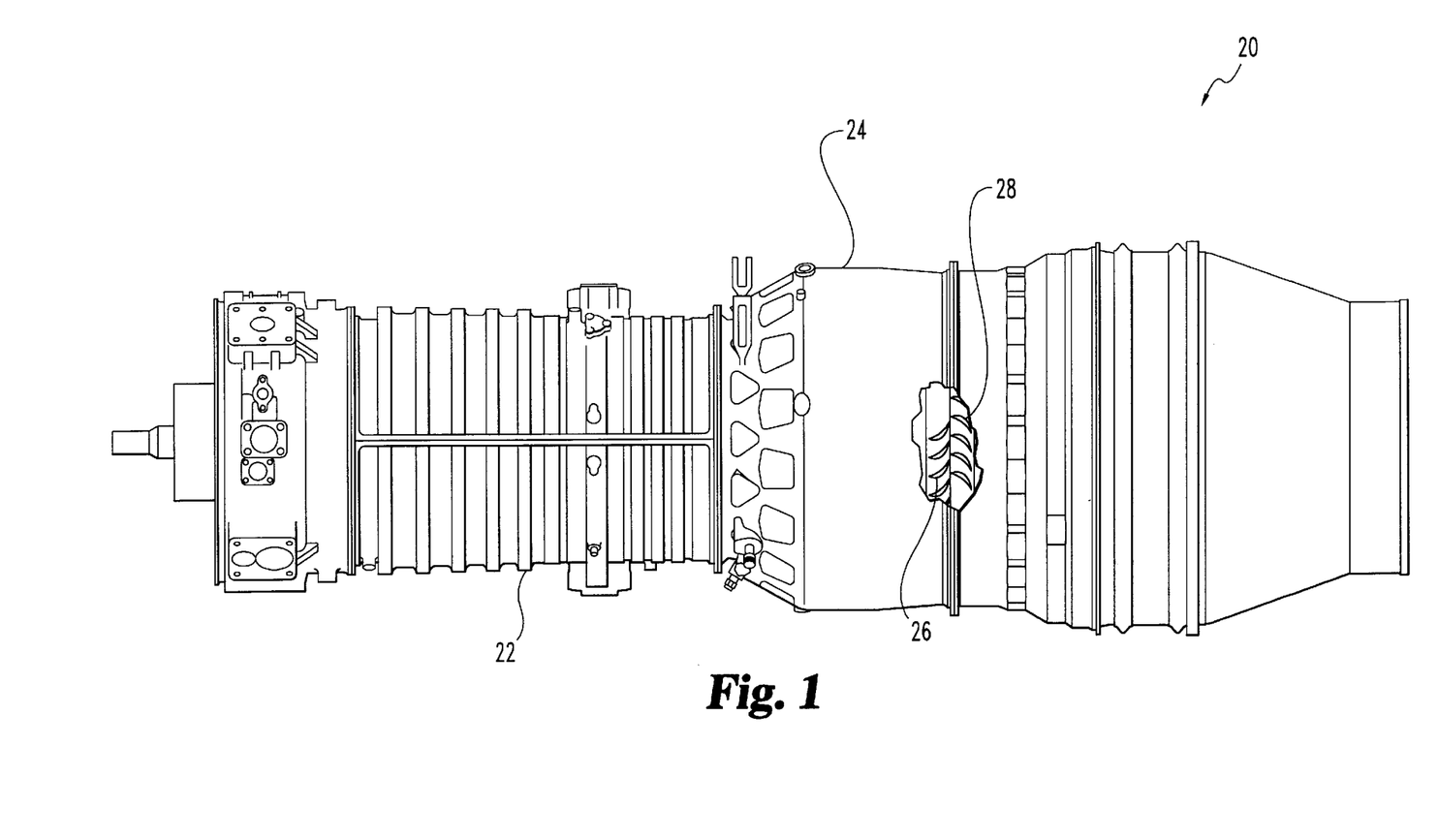
FIG. 1 is a side diagrammatic view of a gas turbine engine with which the present invention is useful.

FIG. 1 is a side diagrammatic view of a gas turbine engine 20 with which the present invention is useful. A compressor assembly 22 is attached to a hot section 24. Hot section 24 includes various internal components that are actively cooled, such as turbine blades 26 and turbine vanes 28 as shown underneath the removed section of FIG. 1.

Figure 2:
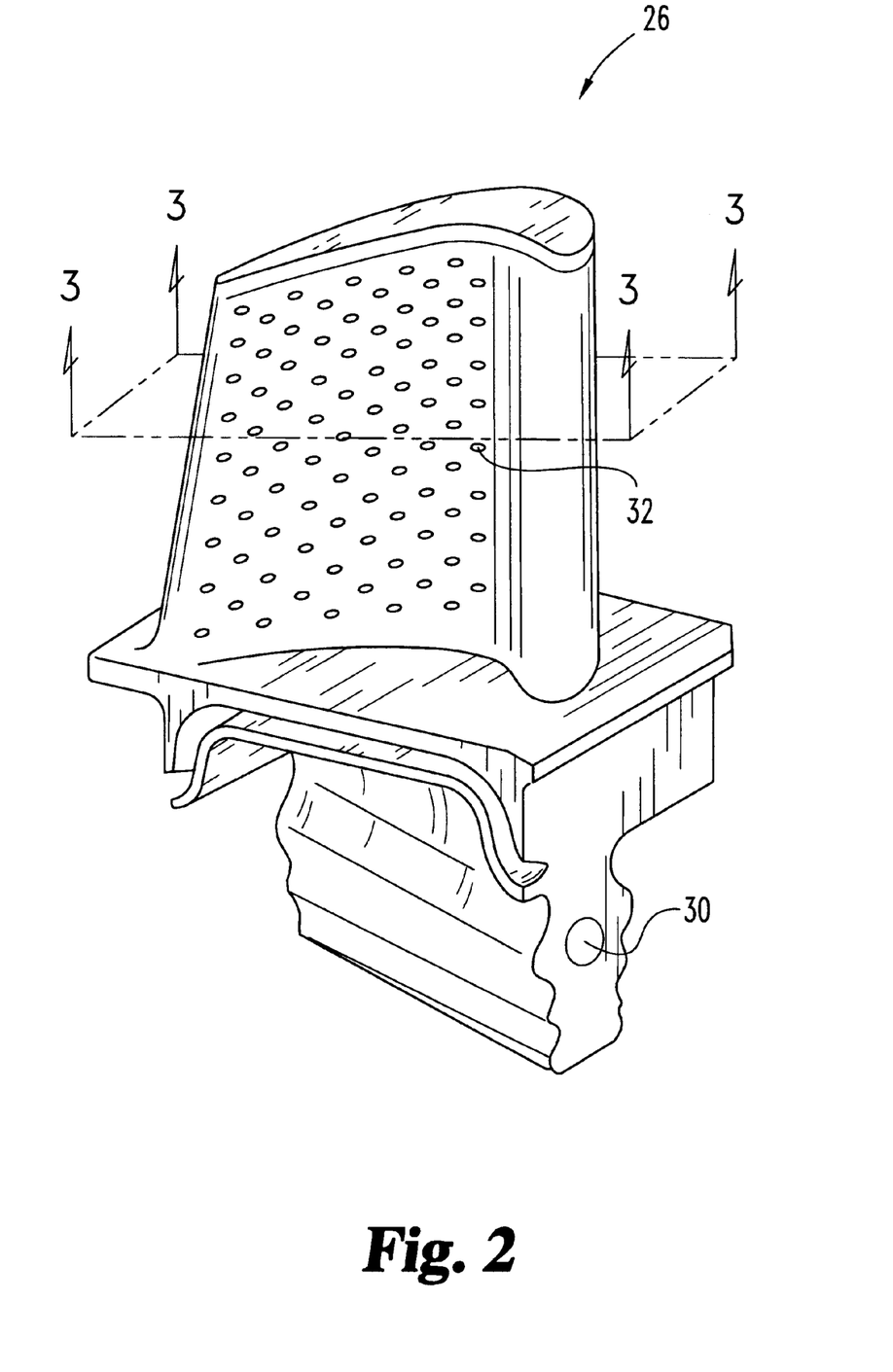
FIG. 2 is a front perspective view of an actively cooled turbine blade brazed according to the present invention.

FIG. 2 is a front perspective view of an actively cooled turbine blade 26 brazed according to the present invention. Cooling air from compressor 22 enters inlet hole 30, cools turbine blade 26 through various internal passageways, and exits through exit holes 32.

Figure 3:
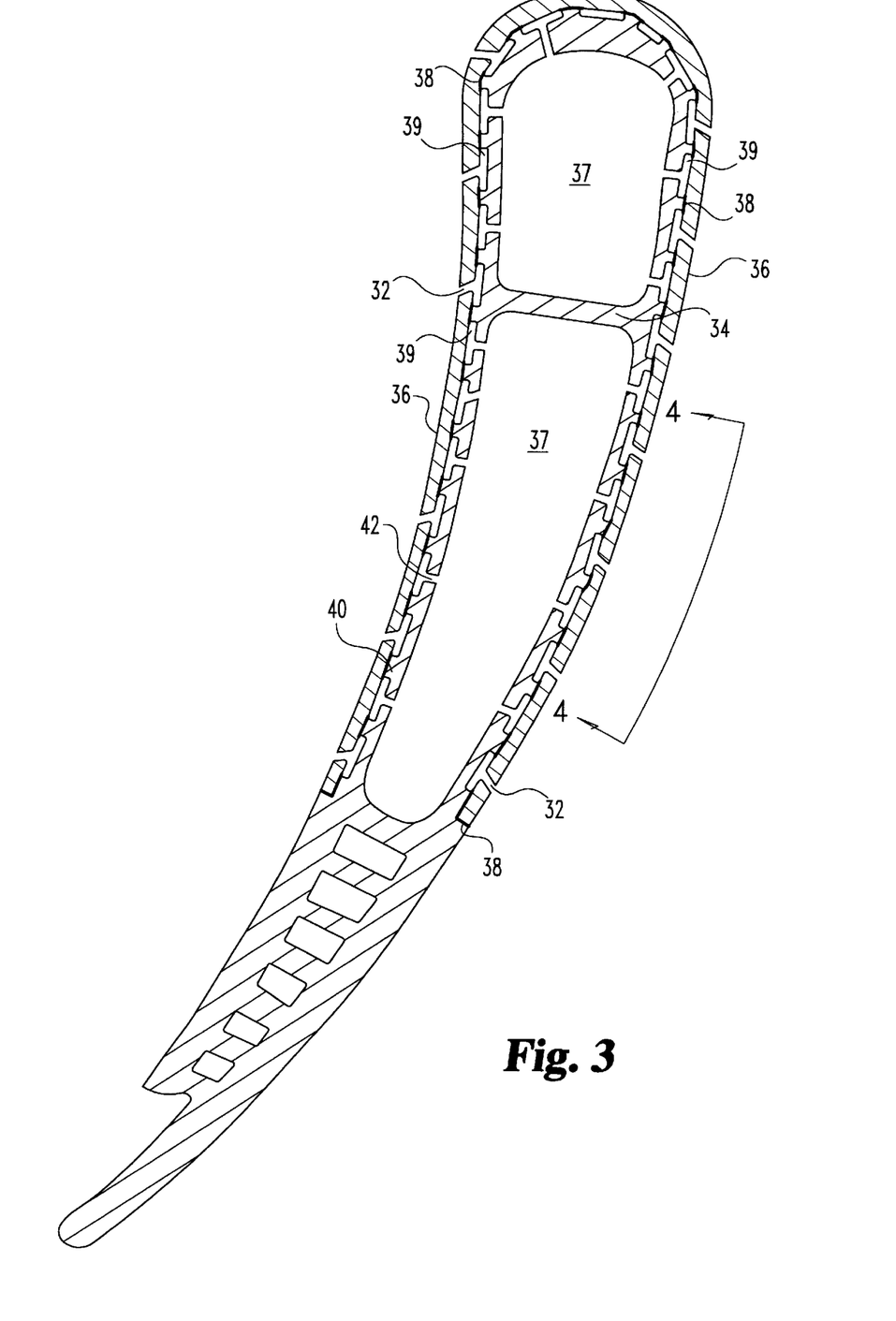
FIG. 3 is a cross sectional view of the turbine blade of FIG. 2 taken along plane 3 of FIG. 2.

FIG. 3 is a cross sectional view of turbine blade 26 taken along plane 3 of FIG. 2. Blade 26 is constructed from an inner core or first workpiece 34 which is joined to an outer covering or second workpiece 36. Cooling air entering hole 30 passes into plenums 37 and into a plurality of blade inlet holes 42. Air from holes 42 flow into a plurality of passageways 39 and around a plurality of pedestals 40, ultimately flowing through exit holes 32. Passageways 39 are formed around pedestals 40 and between workpieces 34 and 36. First workpiece 34 is joined to second workpiece 36 at a plurality of braze joints 38.

Figure 4:
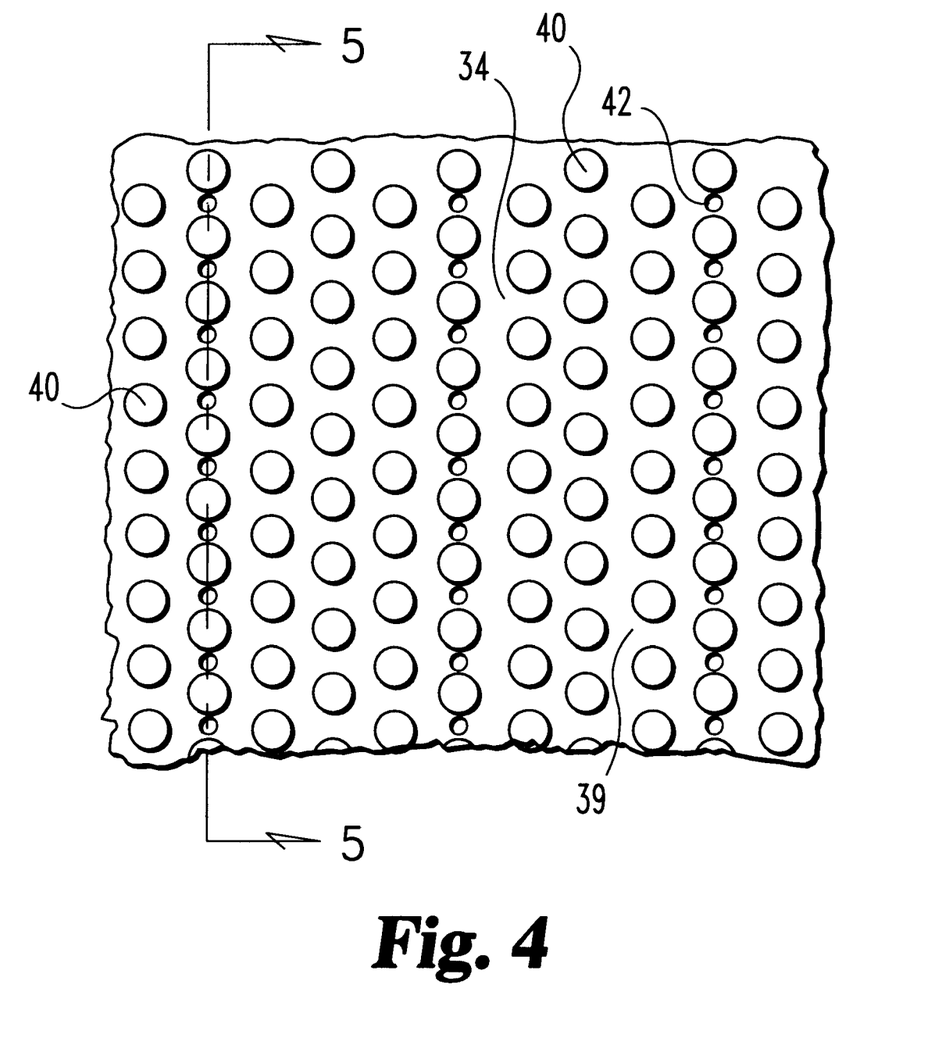
FIG. 4 is a view of a portion of the turbine blade of FIG. 3 taken along line 4—4, with the second workpiece removed, and showing a portion of the first workpiece.

FIG. 4 is a view of first workpiece 34 prior to brazing, as viewed along line 4—4 of FIG. 3. A plurality of projecting pedestals 40 can be seen. A plurality of air inlet holes 42 are shown between some of the pedestals 40. Although the present invention is shown as used with an actively cooled turbine blade with a cooling flowpath of passageways surrounding pedestals, the present invention is also useful with other cooling flowpath configurations.

Figure 5:
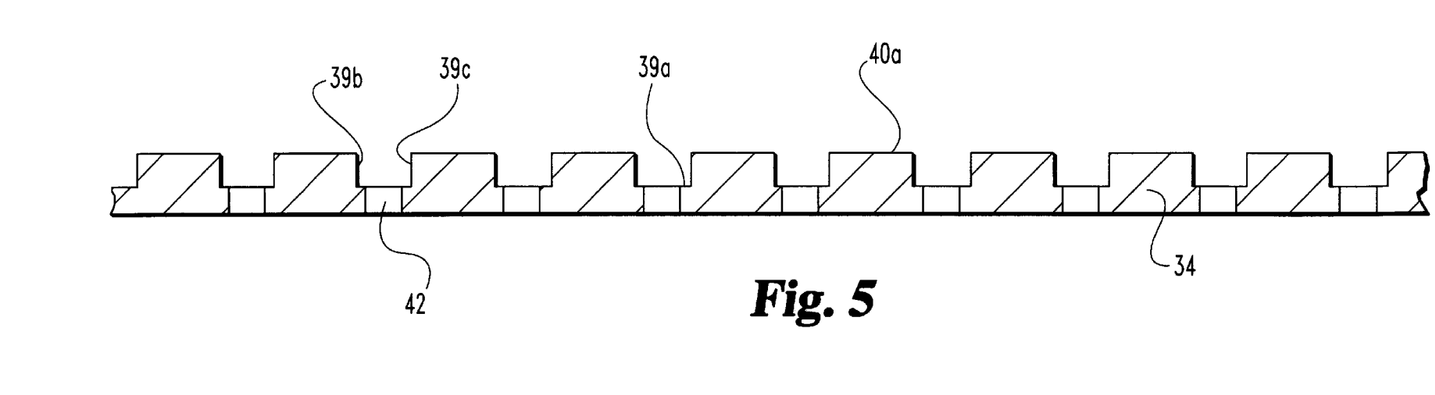
FIG. 5 is a cross sectional view of the portion of the first workpiece of FIG. 4 taken through line 5—5.

FIG. 5 is a cross sectional view of first workpiece 34 of FIG. 4 taken through line 5—5. The present invention contemplates passageways 39 in which the distance between walls 39b and 39c is greater than about 0.010 inch. The present invention contemplates a height from passageway floor 39a to pedestal top 40a greater than about 0.010 inch. Holes 42, as well as holes 32, are generally between about 0.008 and 0.050 inch diameter.

Figure 6:
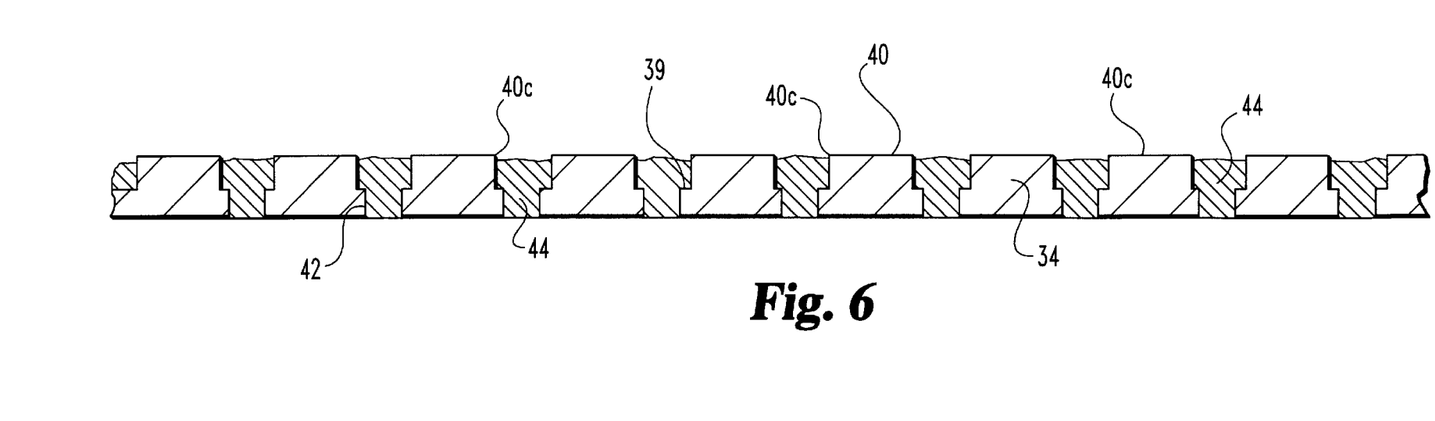
FIG. 6 is a cross sectional view of the portion of the first workpiece of FIG. 4 taken through line 5—5 with nonconductive coating applied according to the present invention.

FIG. 6 shows the portion of first workpiece 34 from FIG. 5 after applying nonconductive coating 44. Nonconductive coating 44 is applied within passageways 39 and holes 32. Those of ordinary skill in the art will recognize that holes 32 can be regarded as either inlet holes or exit holes for cooling air. It is preferable that coating 44 be applied close to corner 40c of pedestal 40.

The present invention includes electrophoretic deposition of brazing material onto features such as pedestals 40 after nearby passageways 39 have been nonconductively coated, with later brazing of the features to a second workpiece. A related art method of applying brazing material by use of a tape preform is not suitable for cooling flowpath designs where the tape preform would need to span a passageway, because of subsequent deposition of brazing material into the passageway which would interfere with the usage of the passageway. Another related art method of applying brazing includes adhering a two-sided tape to the areas to be brazed, and then manually applying brazing material to the exposed side of the tape. This manual method is not desirable for cooling flowpath designs with a plurality of small features, because of expense and nonuniform application that is inherent in a manual method.

Generally, one embodiment of the present invention comprises:

preparing a bath comprised of a solvent solution, a binder, and a compound for ionically interacting with the binder;

mixing into the bath a powder suitable for brazing;

applying a nonconductive coating to a passageway of the first workpiece;

depositing brazing material in the bath by electrophoresis onto a portion of the first workpiece adjacent the passageway;

placing the portion of the first workpiece in contact with a second workpiece; and heating the assembly of the first workpiece and second workpiece such that a braze joint is formed between the second workpiece and the first workpiece.

The electrophoretic deposition occurs in a bath comprised of organic solvents with low viscosity and low surface tension. Generally, the viscosity of the bath is less than about 1 centipoises at room temperature, and the surface tension of the bath is less than about 30 dynes per centimeter. The low viscosity and low surface tension of the bath permit it to readily flow into small features that might otherwise inhibit the flow of high viscosity or high surface tension fluids. The organic solvents also maintain relatively constant properties of low viscosity and low surface tension over a range of temperatures suitable for use in an ambient working environment. Bath specific gravity, prior to addition of brazing material, is about 0.88 to 0.92. A sample electrophoretic bath of one embodiment of the present invention includes:

(a) solvent: 60+/−5% by weight alcohol, and 40+/−5% by weight of a nitroalkane, such as by way of example only nitromethane;

(b) a protein binder: 2–3 grams per liter of solvent; and (c) a complex ionic solute for ionically interacting with the binder, such as by way of example only cobalt nitrate hexahydrate (CNH), 0.1–0.2 grams per liter of solvent.

It is necessary that the alcohol be compatible with the protein, such that the protein is able to act as a surfactant and binder for the brazing material, and such that the protein does not decompose within the alcohol. A preferred combination of alcohol and protein is the combination of isopropanol and zein.

Added to this bath is a brazing material in powder form. A quantity of about 0.02 to 0.03 kilograms of brazing material is added for each liter of bath. The present invention is useful with any type of brazing material. One type of such brazing materials are the nickel alloys, of which NI-405-1 brazing material powder manufactured by Praxair, Inc. is an example. It is desirable for the brazing material to be of a fine powder size for example smaller than about 37 microns. It is preferable that the brazing material powder be of a size less than ten microns. A size less than 10 microns is preferable because of the low viscosity and low surface tension of the solvent. It is also preferable that the powder of brazing material be of a size larger than 1 micron, so as to not make the bath colloidal in nature.

The bath of the present invention thus described is useful for electrophoretically depositing brazing material on conductive surfaces. Therefore, it is necessary to apply a nonconductive coating to those areas of the workpiece in which brazing material should not be deposited. This coating is retained on the workpiece during the deposition of brazing material, and is removed afterwards preferably prior to brazing. Suitable materials for this coating include silicone rubber; AC 818 chemical resistant maskant, manufactured by AC Products, Inc.; a mixture of Nicrobraz white stopoff powder, manufactured by Wall Colmonoy, Inc., and Adsol 129OR cement, manufactured by Amdry, Inc.; and other similar compounds and mixtures. The mixture of Nicrobraz stopoff powder and Adsol 1290R cement is advantageous as a nonconductive coating, in that the mixture can be left on the workpiece during a prewetting furnace cycle at which time it inhibits flow of the brazing material into the passageways and holes. The coating materials should be resistant to the electrophoretic bath.

The nonconductive coating is applied wherever it is preferable to not deposit brazing material. For example, when the present invention is applied to a first workpiece of an actively cooled turbine blade or vane, the maskant is applied within the cooling passageways. It is preferable that the coating be applied throughout the passageway, including in cooling holes and near corners, edges, and other features that act as boundaries between the cooling passageways and adjacent areas that are ultimately part of the finished braze joint. As shown in FIG. 6, nonconductive coating 44 has been applied near corner 40c of pedestal 40. Proximity of coating 44 to corner 40c is preferable because of the increased attraction of brazed powder in the electrophoretic bath to an external corner. If the coating material is not applied sufficiently close to a feature such as corner 40c or sufficiently thick to prevent voltage leakage, then brazing material is deposited within the passageway along corner 40c which can interfere with the function of the passageway.

After the bath has been prepared and the nonconductive coating applied to the workpiece, the first workpiece is inserted into the bath as a cathode. The bath also contains an anode, preferably one that is complementary in shape to the workpiece. A voltage is applied between the cathode and anode such that an initial current density of approximately 0.1–0.2 amps per square decimeter is achieved. This voltage is maintained constant throughout the deposition process. The voltage is maintained for a period of time necessary to achieve the required deposition of brazing material. The amount of brazing material required depends upon factors such as the type of brazing material, type of material the workpieces are constructed from, and characteristics desired for the final braze joints. The amount of brazed material deposited is established by routine experimentation by those of ordinary skill in the art. It is preferable to stir the mixture moderately and continuously during the deposition process. It is preferable to maintain the temperature of the bath near room temperature, from about 60 deg. F. to about 90 deg. F.

After the proper amount of brazing material has been deposited, the workpiece is removed from the bath and permitted to dry. The workpiece has on it a deposit that includes not only brazing material, but also zein, cobalt nitrate hexahydrate, and solvent residue. Because of the manner in which this deposit is created, the bath constituents are distributed throughout the deposit. The present invention includes the discovery that the zein, CNH, and solvent residues can be burned off prior to brazing with no apparent effect on the desirable characteristics of the final braze joint. As an example of a suitable method for burning off the residue, the workpiece can be heated at a relatively slow rate of about 15 degrees F. per minute up to about 1,000 degrees F., and then maintained at about 1,000 degrees F. for a period of about 10 minutes.

After the burnoff of bath residue, it may be advantageous for certain applications of the present invention to prewet the brazing material. Prewetting heats the brazing material and first workpiece to a temperature close to, but lower than, the final brazing temperature. During this prewetting, the brazing material partially melts and becomes adherent to the workpiece. Is is desirable to maintain the nonconductive coating in place during prewetting. Prior to prewetting, the deposited brazing material may not have sufficient mechanical strength to withstand subsequent handling. Removal of the nonconductive coating prior to prewetting can result in removal of brazing material. This prewetting is advantageous for those applications in which the workpiece with brazed material is handled subsequently, such that it would otherwise become loose and fall off of the first workpiece prior to final brazing. This prewetting is also advantageous for brazing small features, since the loss of even a small amount of brazing material on a small feature can significantly affect the integrity of the final braze joint.

The first workpiece, with deposits of prewetted brazing material thereon, is placed against a second workpiece to which it is to be brazed. The manner of brazing, including the time and temperature cycle of the furnace, has been found to be unaffected by the electrophoretic process. Brazing can be accomplished in any manner suitable for the particular alloys, as known to those of ordinary skill in the art.

Reference will now be made to specific examples using the processes described above. It is to be understood that the examples are provided to more completely describe preferred embodiments, and that no limitation to the scope of the invention is intended thereby.

EXAMPLE 1
DETERMINATION OF THE EFFECTS OF BINDER AND BATH RESIDUE ON THE BRAZE JOINT

A slurry of brazing powder, CNH, and small amounts of isopropanol and nitromethane was prepared. The brazing powder was NI-405-1, , screened to about 37 microns. The slurry was applied by brush to a first coupon of PW1480 material. The coupon with slurry was air dried. A second coupon of CMSX-4 material was then put in contact with the brazed material. The assembly was placed in a furnace which was programmed with the following thermal cycle:

| Heating Rate Degrees F./Minute | Dwell Temperature Degrees F. | Dwell Time |
| --- | --- | --- |
| 15 | 1000 | 10 Minutes |
| 15 | 1900 | 10 Minutes |
| 25 | 2250 | 2 Hours |

Figure 7:
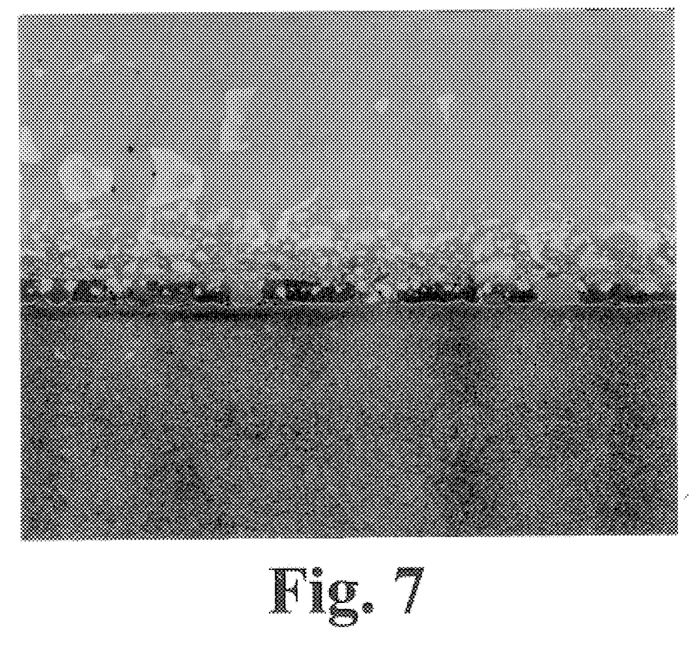
FIG. 7 shows a 200× enlargement of an etched microstructure of a braze joint produced with brazing material which included residue characteristic of an electrophoretic bath of one embodiment of the present invention.

The assembly of the two coupons was removed from the furnace and sectioned. FIG. 7 shows a typical, chemically etched cross-section showing portions of the two coupons and the braze joint therebetween. The brazing material is shown to have melted, wet the surface of both coupons, and formed a braze joint. There were no oxide stringers or other obvious contamination found within the braze joint. The braze joint was unaffected by the binder system or other bath residue. The thickness of the braze joint was about 0.001 inch which is thinner than a typical braze joint but preferable for minimizing filleting and retaining channel shapes.

EXAMPLE 2
ELECTROPHORETIC DEPOSITION WITH NONCONDUCTIVE COATING APPLIED TO PASSAGEWAYS

Figure 8:
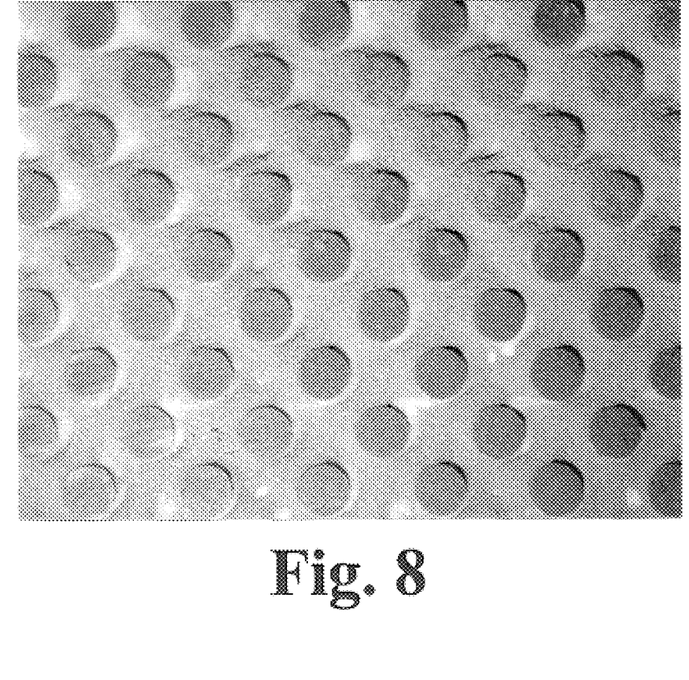
FIG. 8 shows an 8× enlargement of a portion of a coupon which includes pedestal and passageway features useful in the internal structure of an actively cooled turbine component, on to which a nonconductive coating has been applied and brazing material has been electrophoretically deposited according to one embodiment of the present invention.

This trial was performed with a portion of material suitable for use in an actively cooled component in a gas turbine engine. Etched onto this material was a pattern of round pedestals separated by passageways. The pedestals were approximately 0.040 inch in diameter. A series of passageways surround each pedestal, with the distance between pedestals being about 0.025 inch, and the tops of the pedestals being about 0.015 inch above the floor of the passageways. A nonconductive coating of silicone rubber was applied to all passageways of the coupon. The coating was applied to within about 0.005 inch of the corners of the pedestals. An electrophoretic bath of the present invention was prepared as described previously herein. Brazing powder of the type NI-405-1, screened to 37 microns, was added to the bath in the proportion of about 0.03 kilograms per liter. The test coupon was inserted into the bath as a cathode, and voltage was applied as previously described for a period of about 5 minutes. FIG. 8 shows a photograph of the test coupon after the brazed material had been deposited, and with the nonconductive coating still intact.

The results of this trial indicate that additional brazing powder was deposited near the corners. External corners, such as those existing around the pedestals, have a relatively high current density initially during the electrophoretic process. Thus, there was preferential deposition of brazing material onto the external corners during the process.

This additional deposition of brazing material near the edges of the passageways may be useful in certain applications of the present invention. For example, if a thicker braze joint were desired, then the coating material could be applied so that there is a space of about 0.002 inch from the coating to the corners of the features to be brazed.

EXAMPLE 3
EFFECT OF INCREASED AMOUNT OF OF NONCONDUCTIVE COATING

Figure 9:
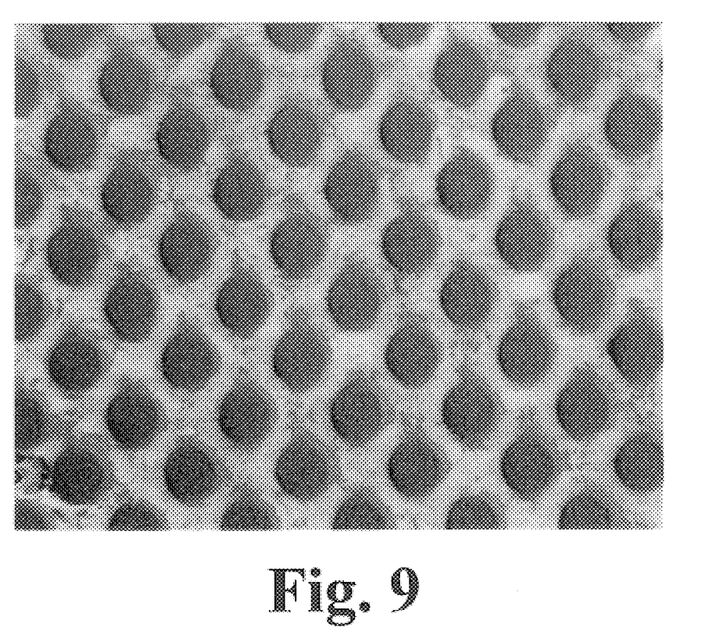
FIG. 9 shows an 8× enlargement of a portion of a coupon which includes pedestal and passageway features useful in the internal structure of an actively cooled turbine component on to which a nonconductive coating has been applied and brazing material has been electrophoretically deposited according to one embodiment of the present invention.

Another coupon was prepared with pedestal and passageway geometry as described for Example 2. A nonconductive coating of Nicrobraz white stopoff powder mixed with Adsol 1290R cement was applied. Nonconductive coating was applied to this coupon such that the coating was about flush with the corners of the pedestals. This coupon was exposed to the electrically charged electrophoretic bath for a period of about 3 minutes. FIG. 9 shows the coupon after the electrophoretic deposition, with the nonconductive coating intact. Note that there appears to be less deposition of brazing material around the corners of the pedestals. The brazing material appears to be deposited uniformly.

Figure 10:
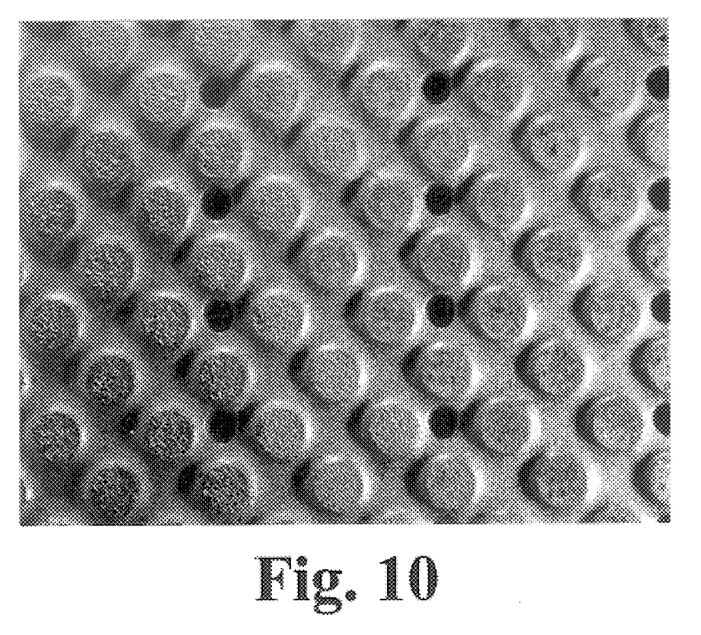
FIG. 10 shows an 8× enlargement of the coupon of FIG. 9 with the nonconductive coating removed and after exposure to a prewetting furnace cycle.

This coupon was air dryed, the bath residue was burned off, and then exposed to 2200 degrees F. for a period of about 1 hour. The purpose of this high temperature exposure was to prewet the deposited brazed material, so that it would be adherent to the top of the pedestal and remain intact during subsequent handling. FIG. 10 shows a portion of the coupon: after prewetting, and also after removal of the nonconductive coating. The brazed material on the pedestals appears slightly melted, but still substantially granular in texture. The passageways between pedestals are generally clear and unobstructed by either brazing material or nonconductive coating. The holes in the coupon are also unobstructed with either brazing material or nonconductive coating. These holes are useful for permitting flow of cooling air through the passageways and around the pedestals.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:
1. A method for brazing, comprising:
   preparing a substantially non-aqueous bath comprised of at least one solvent, a binder, a compound for ionically interacting with the binder, and a powder suitable for brazing, the particle size of the powder being generally less than about 37 microns;
   applying a nonconductive coating to a passageway or within a hole defined on a first workpiece, the first workpiece being a cathode in the bath;
   depositing particles from the powder in the bath by electrophoresis onto a portion of the first workpiece adjacent the coated passageway or coated hole;
   placing the portion of the first workpiece bearing the deposited particles in contact with a second workpiece; and
   heating the first workpiece and second workpiece such that a braze joint is formed between the second workpiece and the first workpiece.
2. The method of claim 1, wherein the bath comprises:
   a solution comprising about 55% to 65% by weight of an alcohol, and about 35% to 45% by weight of a nitroalkane;
   a protein compatible with the alcohol, said protein being about 2 to 3 grams per liter of solution;

cobalt nitrate hexahydrate of about 0.1 to 0.2 grams per liter of solution; and the powder suitable for brazing of about 0.02 to 0.03 kilograms per liter of alcohol and nitroalkane solution, the particle size of the powder being greater than about 1 micron and less than about 10 microns.

3. The method of claim 2, wherein the protein is zein, and the nitroalkane is nitromethane.

4. The method of claim 3, wherein the first and second workpieces are actively cooled components of a gas turbine engine.

5. The method of claim 4, wherein there are at least two passageways separated by a portion of the first workpiece smaller than about 0.040 inch.

6. The method of claim 5, wherein the brazing material is electrophoretically deposited onto a plurality of pedestals.

7. The method of claim 1, wherein the first and second workpieces are actively cooled components as part of a gas turbine engine.

8. The method of claim 7, wherein there are at least two passageways separated by a portion of the first workpiece smaller than about 0.040 inch.

9. The method of claim 8, which further comprises prewetting the deposited particles onto the portion of the first workpiece before said placing.

10. The method of claim 9, wherein the brazing material is electrophoretically deposited onto a plurality of pedestals.

11. A method for brazing, comprising:

preparing a substantially non-aqueous bath suitable for electrophoretic deposition with a viscosity less than about 1 centipoises, the bath including a powder suitable for brazing, the particle size of the powder being generally less than about 37 microns;

applying a nonconductive coating within a hole or a passageway defined on a first workpiece, the first workpiece being a cathode in the bath;

depositing particles from the powder in the bath by electrophoresis onto a portion of the first workpiece adjacent the coated hole or coated passageway;

placing the portion of the first workpiece bearing the deposited particles in contact with a second workpiece; and heating of the first workpiece and second workpiece such that a braze joint is formed between the second workpiece and the first workpiece.

12. The method of claim 11, wherein the bath comprises:

a solution comprising an alcohol and a nitroalkane;

a protein compatible with the alcohol;

a compound for ionically interacting with the protein; and the powder suitable for brazing having a particle size greater than about 1 micron and less than about 10 microns.

13. The method of claim 12, wherein the protein is zein, and the nitroalkane is nitromethane.

14. The method of claim 13, wherein the first and second workpieces are components of a gas turbine engine.

15. The method of claim 14, wherein the hole is for flowing of cooling air and has a diameter less than about 0.050 inch.

16. The method of claim 15, wherein the brazing material is electrophoretically deposited onto a plurality of pedestals.

17. The method of claim 11, wherein the first and second workpieces are components of a gas turbine engine.

18. The method of claim 17, wherein the hole is for flowing of cooling air.

19. The method of claim 18, which further comprises prewetting the deposited particles onto the portion of the first workpiece before said placing.

20. The method of claim 19, wherein the brazing material is electrophoretically deposited onto a plurality of pedestals.

21. A method for brazing, comprising:

preparing a substantially non-aqueous bath suitable for electrophoretic deposition with a surface tension less than about 30 dynes per centimeter, the bath including a powder suitable for brazing, the particle size of the powder being generally less than about 37 microns;

applying a nonconductive coating within a hole or a passageway defined on a first workpiece, the first workpiece being a cathode in the bath;

depositing particles from the powder in the bath by electrophoresis onto a portion of the first workpiece adjacent the coated hole or coated passageway;

placing the portion of the first workpiece bearing the deposited particles in contact with a second workpiece; and heating the first workpiece and second workpiece such that a braze joint is formed between the second workpiece and the first workpiece.

22. The method of claim 21, wherein the bath comprises:

a solution comprising an alcohol and a nitroalkane;

a binder for the deposited powder;

a compound for ionically interacting with the binder; and the powder suitable for brazing having a particle size less than about 10 microns.

23. The method of claim 22, wherein the binder is zein, and the nitroalkane is nitromethane.

24. The method of claim 23, wherein the first and second workpieces are components of a gas turbine engine.

25. The method of claim 24, wherein the first and second workpieces are components of a turbine blade for a gas turbine engine.

26. The method of claim 25, wherein the hole or passageway is used for flowing of cooling air.

27. The method of claim 26, wherein the brazing material is electrophoretically deposited onto a plurality of pedestals.

28. The method of claim 21, wherein the first and second workpieces are components of a gas turbine engine.

29. The method of claim 28, wherein the hole or passageway is for flowing of cooling air.

30. The method of claim 29, which further comprises prewetting the deposited particles onto the portion of the first workpiece before said placing.

31. The method of claim 30, wherein the brazing material is electrophoretically deposited onto a plurality of pedestals.

* * * * *